(12) United States Patent
Fujii (10) Patent No.: US 7,129,681 B2
(45) Date of Patent: Oct. 31, 2006

(54) POWER SUPPLY APPARATUS HAVING PARALLEL CONNECTED SWITCHING AND SERIES REGULATORS AND METHOD OF OPERATION

(75) Inventor: Tatsuya Fujii, Hyogo-ken (JP)

(73) Assignee: Ricoh Company, Ltd. (JP)

( * ) Notice: Subject to any disclaimer, the term of this patent is extended or adjusted under 35 U.S.C. 154(b) by 444 days.

(21) Appl. No.: 10/645,603

(22) Filed: Aug. 22, 2003

(65) Prior Publication Data
US 2004/0105198 A1 Jun. 3, 2004

(30) Foreign Application Priority Data
Aug. 23, 2002 (JP) .............................. 2002-244232

(51) Int. Cl.
*G05F 1/40* (2006.01)
(52) U.S. Cl. ..................................................... 323/268
(58) Field of Classification Search ................ 323/268, 323/269, 272
See application file for complete search history.

(56) References Cited

U.S. PATENT DOCUMENTS 5,258,701 A * 11/1993 Pizzi et al. ................. 323/269
6,249,110 B1 * 6/2001 Geyer et al. ................ 323/272
6,424,128 B1 * 7/2002 Hiraki et al. ............... 323/268
6,636,023 B1 * 10/2003 Amin ........................ 323/268

FOREIGN PATENT DOCUMENTS

JP          A-11-3126          1/1999

* cited by examiner

*Primary Examiner*—Shawn Riley
(74) *Attorney, Agent, or Firm*—Dickstein Shapiro LLP (57) ABSTRACT

A power supply apparatus includes a switching regulator, a series regulator, and a controller. The switching regulator performs start and stop operations in response to a first control signal and generates a first constant voltage in response to a first voltage switching signal to output the second constant voltage. The series regulator performs start and stop operations in response to a second control signal and generates a second constant voltage in response to a second voltage switching signal to output the second constant voltage. The controller generates the first and second control signals and the first and second voltage switching signals and controls the switching regulator and the series regulator to simultaneously operate for at least a predetermined time period using the first and second control signals, respectively, and such that an output voltage of the switching regulator is greater than an output voltage of the series regulator.

14 Claims, 7 Drawing Sheets

FIG. 7

POWER SUPPLY APPARATUS HAVING PARALLEL CONNECTED SWITCHING AND SERIES REGULATORS AND METHOD OF OPERATION

This patent specification is based on Japanese patent application No. 2002-244232 filed on Aug. 23, 2002 in the Japanese Patent Office, which is hereby incorporated by reference in its entirety.

FIELD OF THE INVENTION

The prevent invention relates to power supply apparatuses for use in apparatuses employing a battery such as e.g., cellular phones and more particularly to a power supply apparatus and its method for reducing power consumption.

BACKGROUND OF THE INVENTION

Recently, there has been a trend toward power consumption reduction of electrical appliances, particularly with battery-operated apparatuses depending on environmental concerns. Generally, means for power consumption reduction requires two important things. One is to reduce power consumed by electrical appliances. The other is to improve efficiency of the power supply itself and minimize wasteful power consumption.

One method for reducing power consumed by an apparatus includes dropping a voltage supplied to the apparatus. Recent apparatuses are tending to become multi-functional and various types of circuits are activated at various operation modes depending on the usage. In addition, another method includes dropping a voltage of the apparatus in response to various kinds of circuits. A power supply voltage meeting such performance requirements varies. Generally, to avoid a complicated power supply circuit, the power supply circuits are set for a circuit that requires the highest voltage. Such power supply circuits also need to supply the voltage to a circuit that satisfactorily performs even with a low voltage, resulting in the consumption of wasteful electric power.

On the other hand, commonly available direct current power sources include a switching regulator and a series regulator. The switching regulator provides a high efficiency in a rated load, high ripple of an output voltage and a high noise during operation, and relatively high power consumed by the regulator, thereby significantly reducing efficiency when a load consumes less power. Further, the switching regulator has a slightly slow response time in response to a rise time, input voltage fluctuations, and load variations so that an output voltage stability is limited.

Meanwhile, with large load current, the series regulator provides a low efficiency due to a high power consumed by a control transistor, low ripple of an output voltage, and low noise during operation. In addition, the series regulator can reduce power consumed by an internal power source control circuit. Thus, with small load current, the series regulator is often more efficient than the switching regulator. Further, the series regulator has a quick response time in response to a rise time, input voltage fluctuations, and load variations, thereby increasing output voltage stability.

Figure 1:
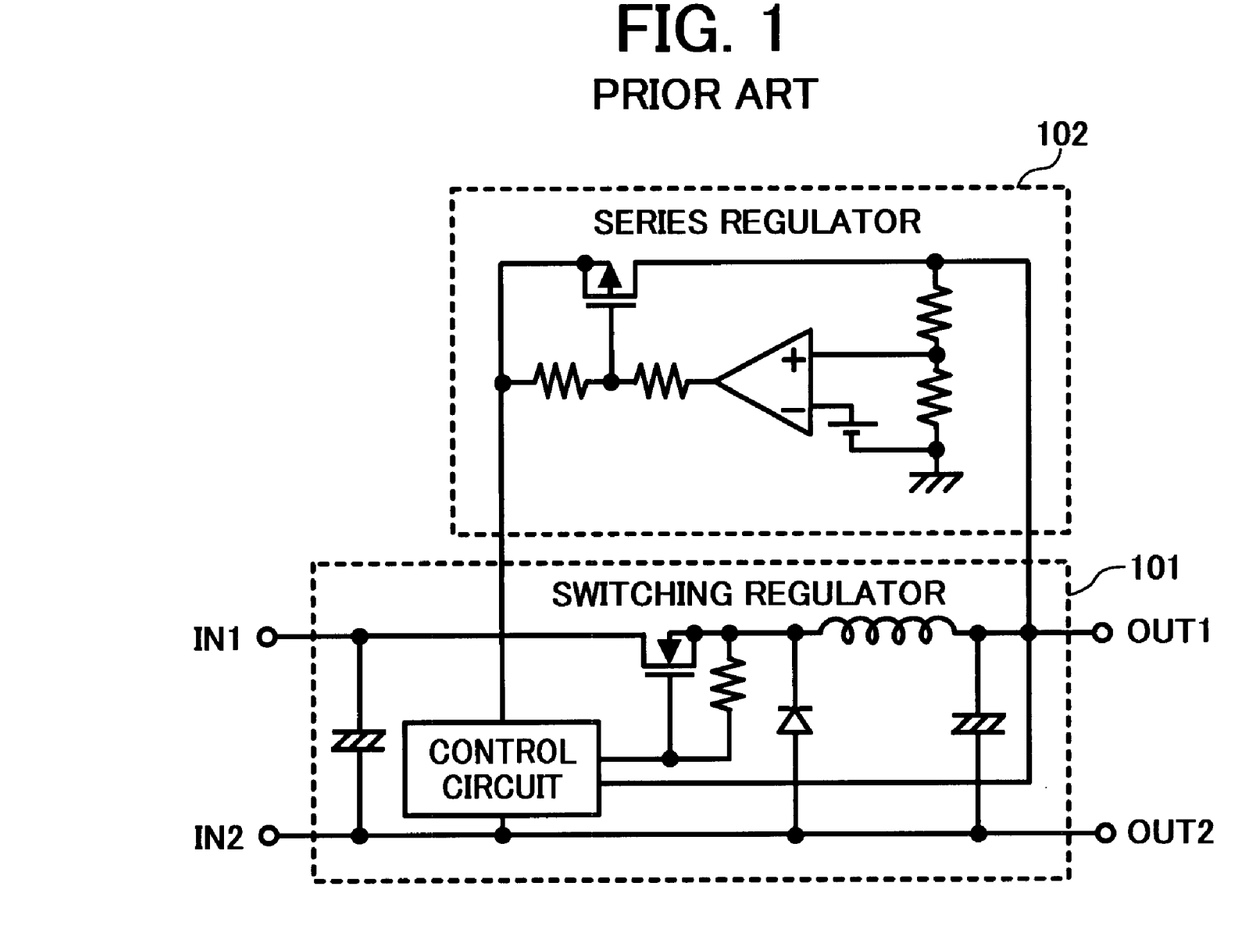
FIG. 1 is a circuit diagram illustrating an example of the conventional power supply apparatus.

In this way, the direct current power sources have the above-mentioned types of regulators and make the most of each regulator's characteristics to reduce electric power. Conventionally, various power sources having these two regulator's characteristics are suggested. One example is described in Japanese Laid-Open Patent Application Publication No. 11-3126. FIG. 1 illustrates a DC-DC converter as described in the above-mentioned publication.

In FIG. 1, IN1 and IN2 are input terminals at which a voltage Vi (e.g., 5 volts) is supplied from a direct current power source (not shown). OUT1 and OUT2 are output terminals for outputting a predetermined direct current power source Vo (e.g., 3 volts). A switching regulator 101 and a series regulator 102 are connected in parallel between these input terminals and output terminals, respectively. An output voltage of the series regulator 102 is set slightly lower than the output voltage (e.g., 2.95 volts) of the switching regulator 101.

When the output voltage generated by the slow-responding switching regulator 101 drops from 3 volts to 2.95 volts or lower due to input voltage fluctuations and load variations, the quick-response series regulator 102 starts its control operation so as to maintain an output voltage Vo at 2.95 volts. When the output voltage Vo again rises to be higher than 2.95 volts, the series regulator 102 is deactivated, decreasing the consumed voltage in the series regulator 102. In this way, the switching regulator 101 can achieve a quick response speed from the switching regulator 102 while maintaining high efficiency.

However, in the configuration described in Japanese Patent Laid-Open Application Publication No. 11–3126, response characteristics of the power source is only improved. With a low output voltage, the series regulator 102 instead of the switching regulator 101 is not used and continues to activate the switching regulator 101 having significantly decreased efficiency, resulting in the consuming of wasteful electric power. Moreover, under certain operating conditions in certain kinds of loads, a decrease in the output voltage can further decrease the electric power consumption. Such considerations, however, are not made.

Figure 2:
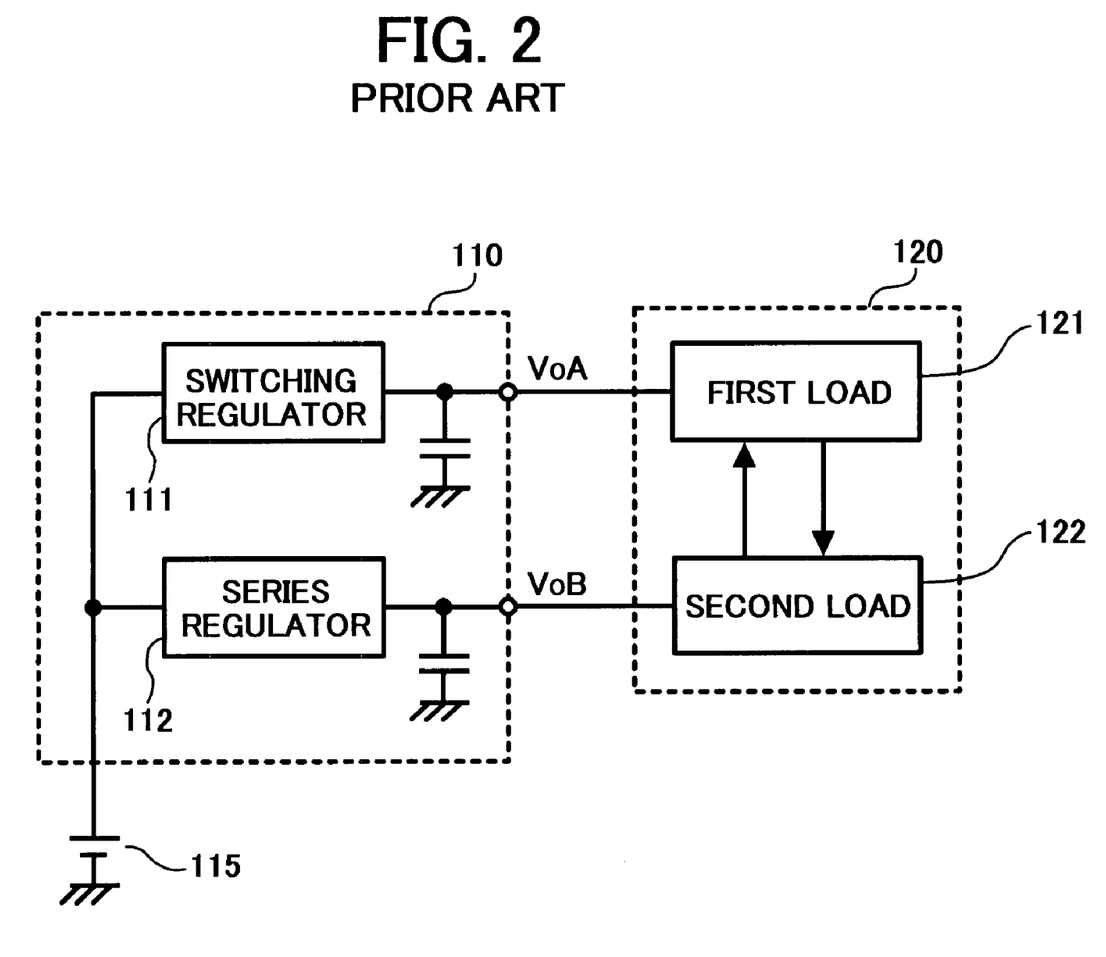
FIG. 2 is a circuit diagram illustrating another example of the conventional power supply apparatus.

Alternatively, to reduce the electric power consumption of the apparatus, electric power including a plurality of voltages is supplied to the apparatus as a power source voltage to meet performances of the load mounted on the apparatus. As shown in FIG. 2, for example, a system apparatus 120 includes a first load 121 and a second load 122. The first load 121 receives a predetermined constant voltage VoA from a switching regulator 111 as a power source voltage. The second load 122 receives a predetermined constant voltage VoB from a series regulator 112 as a power source voltage. The first load 121 operates at greater power source voltage than the second load 122 so that the switching regulator 111 and the series regulator 112 output predetermined constant voltages, respectively, so as to provide a formula VoA>VoB.

In this case, the second load 122, which operates at a low power source voltage, generally includes a protection circuit to avoid leakage current from the first load 121 which operates at a high power source voltage. In order to reduce electric power consumption of the system apparatus 120, one approach is that the power source voltage in the first load 121 and the second load 122 is also reduced depending on the usage. For example, when the constant voltages VoA and VoB which are each power source voltage of the first load 121 and the second load 122 are decreased, the constant voltage VoA should remain above the constant voltage VoB, which is the power source voltage of the second load 122. To eliminate such conditions, the protection circuit is required to be mounted on the first load 121 and the second load 122 to avoid leakage current, thereby increasing the circuit scale.

SUMMARY OF THE INVENTION

In one embodiment, a novel power supply apparatus includes a switching regulator, a series regulator, and a controller. The switching regulator performs start and stop operations in response to a first control signal and generates a first constant voltage in response to a first voltage switching signal to output the first constant voltage. The series regulator performs start and stop operations in response to a second control signal and generates a second constant voltage in response to a second voltage switching signal to output the second constant voltage. The controller generates the first and second control signals and the first and second voltage switching signals, controls the switching regulator and the series regulator for simultaneous operation for at least a predetermined time period using the first and second control signals, respectively. The controller controls the switching regulator and the series regulator such that the first output voltage of the switching regulator is greater than the second output voltage of the series regulator using the first and second voltage switching signals.

The controller may generate a third control signal and a third voltage switching signal.

The series regulator may include a plurality of series regulators, and the controller may selectively activate the plurality of series regulators using the third control signal and the third voltage switching signal.

At least one of the plurality of series regulators may be a low-current-consuming series regulator consuming power less than the rest of the plurality of series regulators and the controller may activate the low-current-consuming series regulator in a low-consuming-current mode of the apparatus.

Further, in one embodiment, a novel power supply apparatus which supplies different output voltages to a plurality of electric loads includes a switching regulator, a series regulator, and a controller. The switching regulator performs start and stop operations in response to a first control signal and generates a first constant voltage in response to a first voltage switching signal to output the first constant voltage to one of the plurality of electric loads. The series regulator performs start and stop operations in response to a second control signal and generates a second constant voltage in response to a second voltage switching signal to output the second constant voltage to another one of the plurality of electric loads. The controller generates the first and second control signals and the first and second voltage switching signals, controls the first and second voltage switching signals such that the first constant voltage of the switching regulator is greater than the second constant voltage of the series regulator, and controls the switching regulator and the series regulator such that the first output voltage of the switching regulator is greater than the second output voltage of the series regulator using the first and second voltage switching signals during a time the switching regulator and the series regulator simultaneously operate.

Further, in one embodiment, a novel power supply apparatus includes switching regulating means, series regulating means, and controlling means. The switching regulating means performs start and stop operations in response to a first control signal and generates a first constant voltage in response to a first voltage switching signal to output the first constant voltage. The series regulating means performs start and stop operations in response to a second control signal and generates a constant voltage in response to a second voltage switching signal to output the constant voltage. Controlling means generates the first and second control signals and the first and second voltage switching signals, controls the switching regulating means and the series regulating means to simultaneously operate for at least a predetermined time period using the first and second control signals, respectively, and controls the switching regulating means and the series regulating means such that the first output voltage of the switching regulating means is greater than the second output voltage of the series regulating means using the first and second voltage switching signals.

The controlling means may generate a third control signal and a third voltage switching signal.

The series regulating means may include a plurality of series regulating means, and the controlling means may selectively activate the plurality of series regulating means using the third control signal and the third voltage switching signal.

At least one of the plurality of series regulating means may be a low-current-consuming series regulating means for consuming power less than the rest of the plurality of series regulating means and the controlling means may activate the low-current-consuming series regulating means in a low-consuming-current mode of the apparatus.

Further, in one embodiment, a novel power supply apparatus which supplies different output voltages to a plurality of electric loads includes a switching regulating means, a series regulating means, and a controlling means. The switching regulating means performs start and stop operations in response to a first control signal and generates a first constant voltage in response to a first voltage switching signal to output the first constant voltage to one of the plurality of electric loads. The series regulating means performs start and stop operations in response to a second control signal and generates a second constant voltage in response to a second voltage switching signal to output the second constant voltage to another one of the plurality of electric loads. The controlling means generates the first and second control signals and the first and second voltage switching signals, controls the first and second voltage switching signals such that the first constant voltage of the switching regulating means is greater than the second constant voltage of the series regulating means, and controls the switching regulating means and the series regulating means such that the first output voltage of the switching regulating means is greater than the second output voltage of the series regulating means using the first and second voltage switching signals during a time the switching regulating means and the series regulating means simultaneously operate.

Further, in one embodiment, a novel power supply method includes the steps of first generating, second generating, first controlling, third generating, and second controlling. The first generating step generates a first control signal for turning on and off a switch regulator. The second generating step generates a second control signal for turning on and off a series regulator. The first controlling step controls the first and second control signals to activate the switching regulator and the series regulator for at least a predetermined time period. The third generating step generates the first voltage switching signals for turning on and off the switch regulator. The fourth generating step generates the second voltage switching signals for turning on and off the series regulator. The second controlling step controls the first and second voltage switching signals such that the first output voltage of the switching regulator is greater than the second output voltage of the series regulator.

The series regulator may include a plurality of series regulating circuits and the first and second controlling steps may selectively activate one of the plurality of series regulating circuits.

At least one of the plurality of series regulating circuits may be a low-current-consuming series regulating circuit which consumes less power than the rest of the plurality of series regulating circuits and the first and second controlling steps may activate the low-current-consuming series regulating circuit in a low-consuming-current mode of the apparatus.

Further, in one embodiment, a novel power supply method includes the steps of first generating, second generating, third generating, fourth generating, and controlling. The first generating step generates a first control signal for turning on and off a switch regulator. The second generating step generates a second control signal for turning on and off a series regulator. The third generating step generates the first voltage switching signals for turning on and off the switch regulator. The fourth generating step generates the second voltage switching signals for turning on and off the series regulator. The controlling step controls the first control signal and the third voltage switching signal to activate the switching regulator and the second control signal and fourth voltage switching signal to activate the series regulator. In this power supply method, the control step may control the first and second control signals to activate the switching regulator and the series regulator for at least a predetermined time period.

The controlling step may control the first and second voltage switching signals such that an output voltage of the switching regulator is greater than an output voltage of the series regulator.

Further, in one embodiment, a novel power supply method includes the steps of first generating, second generating, third generating, fourth generating, and controlling. The first generating step generates a first control signal for turning on and off a switch regulator. The second generating step generates a second control signal for turning on and off a series regulator. The third generating step generates the first voltage switching signals for turning on and off the switch regulator. The fourth generating step generates the second voltage switching signals for turning on and off the series regulator. The controlling step controls the first control signal and the third voltage switching signal to activate the switching regulator and the second control signal and fourth voltage switching signal to activate the series regulator. In this power supply method, the controlling step may control the first and second voltage switching signals such that an output voltage of the switching regulator is greater than an output voltage of the series regulator.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a power supply apparatus 1 according to a preferred embodiment of the present invention is now described.

Figure 3:
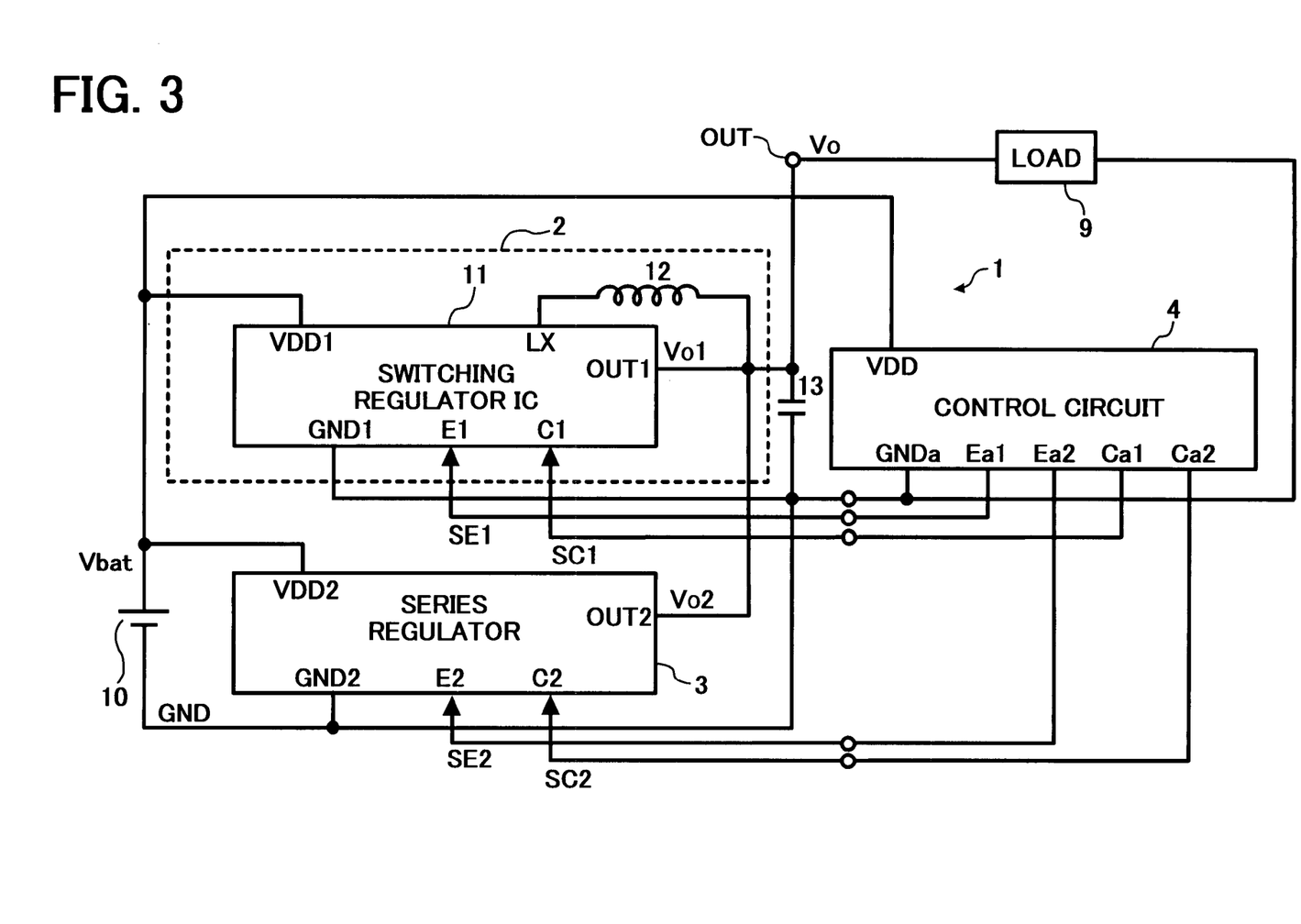
FIG. 3 is a block diagram illustrating an example of a power supply apparatus according to a preferred embodiment of the present invention.

As shown in FIG. 3, the power supply apparatus 1 includes a switching regulator 2, series regulator 3, and control circuit 4. The switching regulator 2 and the series regulator 3 are step-down regulators that switch output voltage values when predetermined signals are input. The control circuit 4 controls the switching regulator 2 and the series regulator 3.

In FIG. 3, the switching regulator 2 has an inductor 12 and a capacitor 13, which form a smoothing circuit for the switching regulator 2, which is externally mounted on a switching regulator IC. In this example, the series regulator 3 is made up of one IC.

In the switching regulator 2, the inductor 12 is connected between a terminal LX and an output terminal OUT1 and the capacitor 13 is connected between the output terminal OUT1 and a negative power supply terminal of a direct current power source 10. The inductor 12 is used as an element for power conversion. The capacitor 13 stabilizes an output voltage Vo1 outputted from the output terminal OUT1 of the switching regulator 2 and an output voltage Vo2 outputted from the output terminal OUT2 of the series regulator 3.

An input terminal VDD1 of the switching regulator 2 and an input terminal VDD2 of the series regulator 3 respectively receive a positive power supply voltage (hereinafter simply referred to as a power supply voltage) Vbat from the direct current power source 10 such as a battery. An output terminal OUT1 of the switching regulator 2 and the output terminal OUT2 of the series regulator 3 are connected to a power source output terminal OUT of the power supply apparatus 1. A control signal input terminal E1 is connected to a control signal output terminal Ea1 of the control circuit 4. The control signal input terminal E1 receives a control signal SE1 for controlling start and stop operations of the switching regulator 2. Likewise, a control signal input terminal E2 is connected to a control signal output terminal Ea2 of the control circuit 4. The control signal input terminal E2 receives a control signal SE2 for controlling start and stop operations of the series regulator 3.

Accordingly, a switching signal input terminal C1 is connected to a switching signal output terminal Ca1 of the control circuit 4. The switching signal input terminal C1 receives a voltage switching signal SC1 for controlling a switching of voltage values of the output voltage Vo1 in the switching regulator 2. Likewise, a switching signal input terminal C2 is connected to a switching signal output terminal Ca2 of the control circuit 4. The switching signal input terminal C2 receives a voltage switching signal SC2 for controlling a switching of voltage values of the output voltage Vo2 in the series regulator 3. The control circuit 4 receives power from the direct current power source 10 and operates by the power supply voltage Vbat from the direct current power source 10 as a power source. A negative power supply input terminal GND1 of the switching regulator 2, a negative power supply input terminal GND2 of the series regulator 3, and a negative power supply input terminal GNDa of the control circuit 4 are connected to a negative power supply terminal of the direct current power source 10 and receive a ground voltage GND. Further, connected between the output terminal OUT1 and the ground voltage GND is a load 9.

The switching regulator 2 starts its operation in response to a control signal SE1 which is at a high level and stops its operation in response to the control signal SE1 which is at a low level to draw substantially no power. Likewise, the series regulator 3 starts its operation in response to the control signal SE2 which is at a high level and stops its operation in response to the control signal SE2 which is at a low level to draw substantially no power.

Additionally, the switching regulator 2 generates a predetermined constant voltage Va1 (not shown) from the power supply voltage Vbat which is the output voltage Vo1 when a low level voltage switching signal SC1 is input. The switching regulator 2 also generates a predetermined constant voltage Vb1 (not shown) which is lower than the voltage Va1 from the power supply voltage Vbat which is the output voltage Vo1 when a high level voltage switching signal SC1 is input.

While a low level voltage switching signal SC2 is input, the series regulator 3 generates a predetermined constant voltage Va2 from the power supply voltage Vbat which is the output voltage Vo2. While a high level voltage switching signal SC2 is input, the series regulator 3 generates a predetermined constant voltage Vb2 which is lower than the voltage Va2 from the power supply voltage Vbat which is the output voltage Vo2. Moreover, the control signal SE1 includes a first control signal, the voltage switching signal SC1 includes a first voltage switching signal, the control signal SE2 includes a second control signal, and the voltage switching signal SC2 includes a second voltage switching signal, respectively.

In this case, the power supply voltage Vbat is 5 volts, the constant voltage Va1 is 3 volts, the constant voltage Vb1 is 2.5 volts, and the constant voltage Va2 is 2.9 volts, the constant voltage Vb2 is 2.4 volts. In this configuration, an example of operation control for the switching regulator 2 and the series regulator 3 controlled by the control circuit 4 is explained with reference to a timing chart of FIG. 4. Further, FIG. 4 illustrates an exemplary signal relationship when the output voltage Vo is decreased from 3 volts to 2.5 volts.

Figure 4:
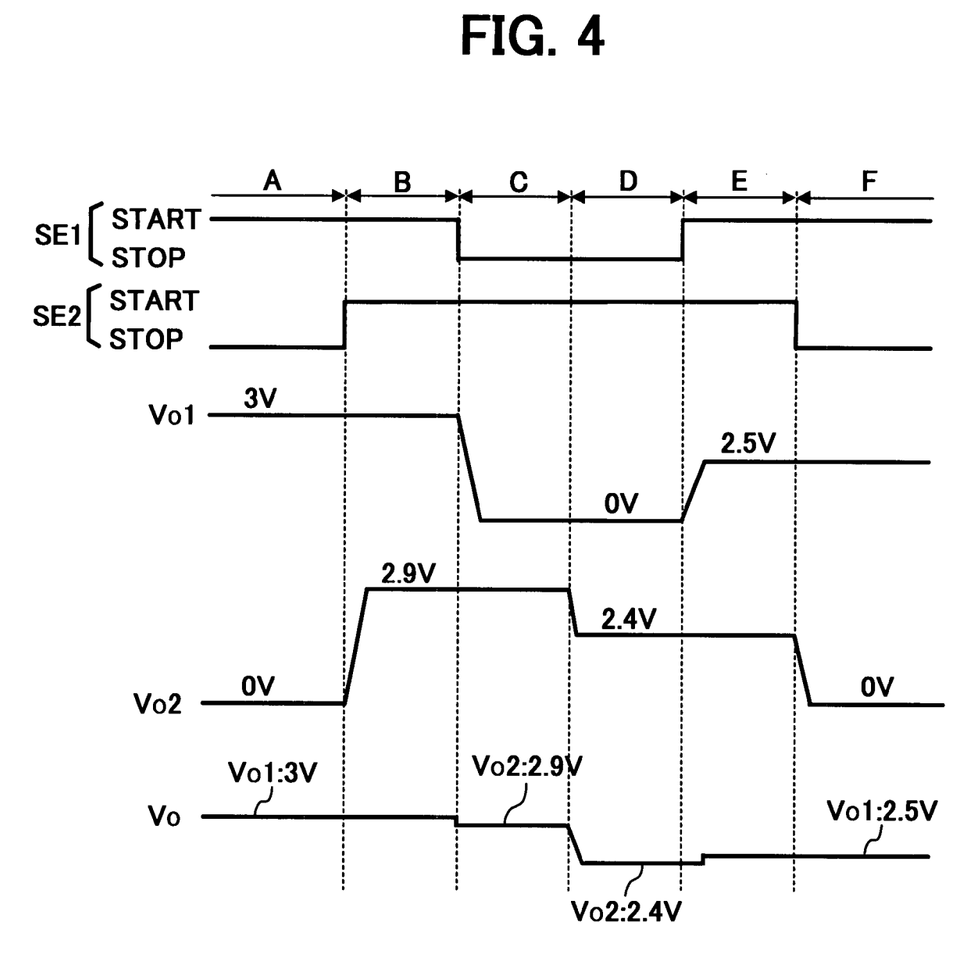
FIG. 4 is a timing chart illustrating an exemplary relationship of signals shown in FIG. 3.

In FIG. 4, a time period A is a time period during which the output voltage Vo1 of 3 volts from the switching regulator 2 is outputted from the output terminal OUT1 as the output voltage Vo.

In the time period A, the switching regulator 2 has a control signal input terminal E1 and a switching signal input terminal C1 which receive the high level control signal SE1 and the low level voltage switching signal SC1, respectively. Simultaneously, the series regulator 3 has a control signal input terminal E2 and a switching signal input terminal SC2 which receive the low level control signal SE2 and the low level voltage switching signal SC2, respectively. Thus, the switching regulator 2 starts its operation while the series regulator 3 stops its operation. The power source output terminal OUT, therefore, outputs a voltage of 3 volts from the switching regulator 2.

A time period B is a time period during which the series regulator 3 is activated to switch the output voltage of the switching regulator 2 from 3 volts to 2.5 volts.

In the time period B, when the control signal SE1 of the switching regulator 2 remains at the high level, the control signal SE2 of the series regulator 3 rises to a high level, increasing the output voltage Vo2 of the series regulator 3 from 0 volt to 2.9 volts. The resulting voltage switching signals SC1 and SC2 remain at the low levels. The output voltage Vo of the time period B remains at 3 volts since the output voltage Vo1 of the switching regulator 2 continues to be outputted.

A time period C is a time period during which the switching regulator 2 temporarily stops its operation to switch the output voltage Vo1 of the switching regulator 2.

In the time period C, when the control signal SE2 of the series regulator 3 remains at a high level, the control signal SE1 to the switching regulator 2 falls to a low level, decreasing the output voltage Vo1 of the switching regulator 2 to 0 volts. The power source output terminal OUT, therefore, outputs a voltage of 2.9 volts from the series regulator 3.

A time period D is a time period during which the output voltage Vo2 of the series regulator 3 is decreased to 2.4 volts in preparation for setting the output voltage Vo1 of the switching regulator 2 to 2.5 volts so as to normally raise the output voltage Vo1 of the switching regulator 2 when the switching regulator 2 is activated.

In the time period D, when the voltage switching signal SC1 of the switching regulator 2 and the voltage switching signal SC2 of the series regulator 3 rises to a high level, the control signal SE1 remains at a low level, so that the output voltage Vo1 of the switching regulator 2 also remains 0 volt. As a result, the power source output terminal OUT outputs the output voltage Vo2 of 2.4 volts from the series regulator 3.

A time period E is a time period during which the switching regulator 2 is activated to set the output voltage Vo to 2.5 volts.

In the time period E, when the control signal SE1 of the switching regulator 2 rises to a high level, the switching regulator 2 is activated to increase the voltage switching signal SC1 to a high level, thereby increasing the output voltage Vo1 to 2.5 volts. Therefore, when the output voltage Vo1 of the switching regulator 2 completely rises, the output voltage Vo is increased from 2.4 volts to 2.5 volts.

A time period F is a time period during which the series regulator 3 stops its operation. In this period, the control signal SE2 of the series regulator 3 falls to a low level, the output voltage Vo2 of the series regulator 3 falls to 0 volt, thereby ending voltage switching of the output voltage Vo.

Figure 5:
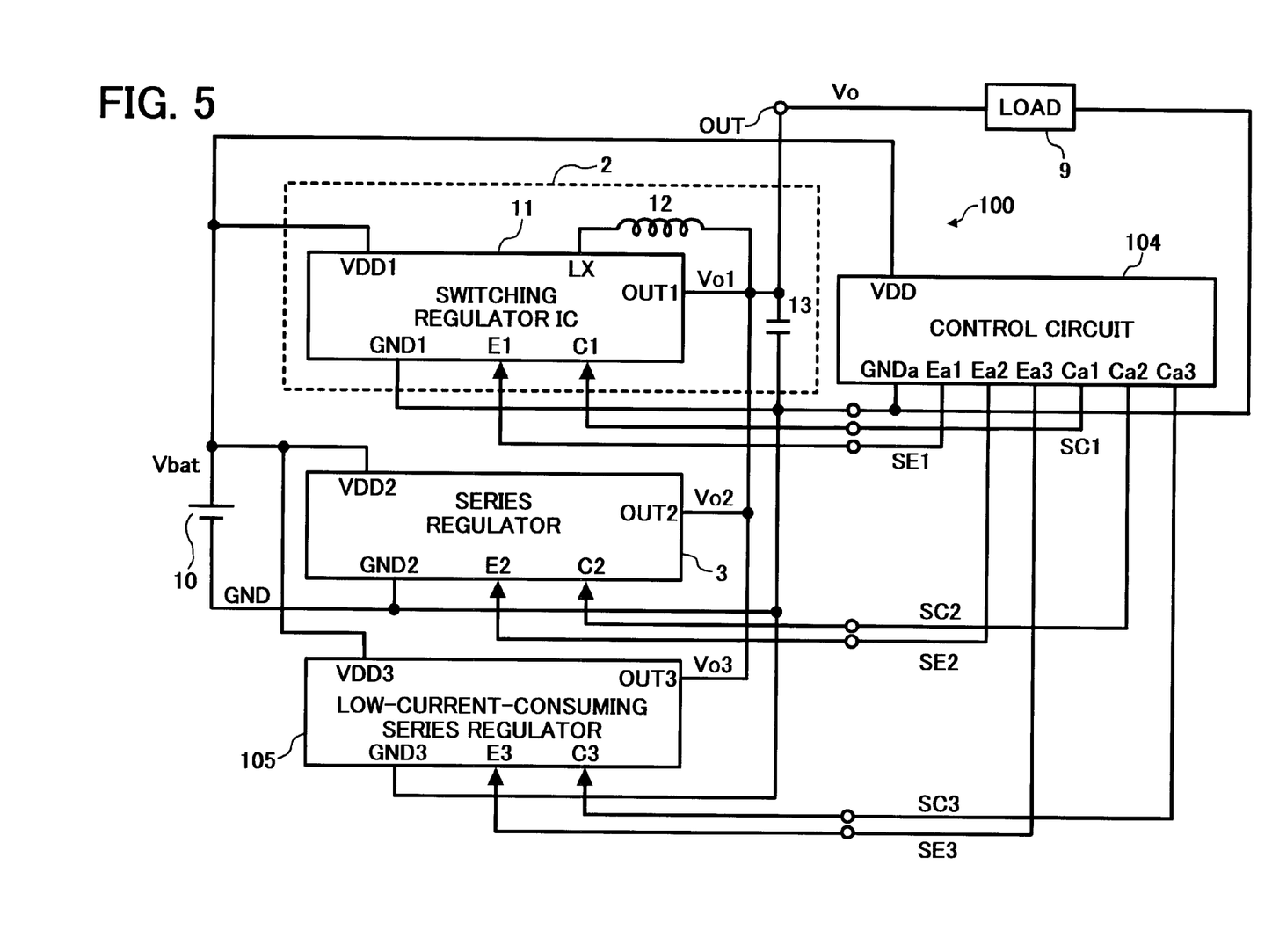
FIG. 5 is a block diagram illustrating a variation of a power supply apparatus according to another preferred embodiment of the present invention.

Meanwhile, when the load 9 stops its operation and a consumed current drops excessively, power to the load 9 may be supplied by a low-current-consuming series regulator. FIG. 5 is a block diagram illustrates an example of a power supply apparatus 100 which has this configuration. In FIG. 5, the same reference numbers are given to the same components as those in FIG. 3 and the detailed descriptions of these components are omitted. Thus, only differences between FIG. 3 and FIG. 5 are described below.

The power supply apparatus 100 of FIG. 5 is similar to the power supply apparatus of FIG. 3, except for a low-current-consuming series regulator 105 and a control circuit 100. The low-current-consuming series regulator 105 consumes lower current than that of the series regulator 3 and the control circuit 104 controls the low-current-consuming series regulator 5.

In FIG. 5, the low-current-consuming series regulator 105 is a step-down series regulator for switching a voltage value of an output voltage when a predetermined signal is input. FIG. 5 illustrates an example of the low-current-consuming series regulator 105, which is made up of one IC. The capacitor 13 stabilizes the output voltage Vo3 output from the output terminal OUT3 of the low-current-consuming series regulator 105.

In the low-current-consuming series regulator 105, an input terminal VDD3 receives the power supply voltage Vbat from the direct current power source 10 and the output terminal OUT3 is connected to the power source output terminal OUT. A control signal input terminal E3 is connected to a control signal output terminal Ea3 of the control circuit 104. The control signal input terminal E3 receives a control signal SE3 from the control circuit 104 for controlling start and stop operations of the low-current-consuming series regulator 105. Accordingly, a switching signal input terminal C3 is connected to a switching signal output terminal Ca3 of the control circuit 104. The switching signal input terminal C3 receives a voltage-switching signal SC3 for controlling a switching of a voltage value of the output voltage Vo3 in the low-current-consuming series regulator 105. A negative power supply input terminal GND3 of the low-current-consuming series regulator 105 is connected to a negative power supply terminal of the direct current power source 10 and receives a ground voltage GND.

The low-current-consuming series regulator 105 starts its operation in response to a control signal SE3 which is at a high level and stops its operation in response to a low level control signal SE3 to draw substantially no power. Additionally, the low-current-consuming series regulator 105 generates a predetermined constant voltage Va3 from the power supply voltage Vbat which is the output voltage Vo3 when a low level voltage switching signal SC3 is input. The low-current-consuming series regulator 105 also generates a predetermined constant voltage Vb3 which is lower than the voltage Va3 from the power supply voltage Vbat which is the output voltage Vo3 when a high level voltage switching signal SC3 is input. Moreover, the control signal SE3 and the voltage switching signal SC3 include a second control signal and a second voltage switching signal, respectively. The series regulator 3 and the low-current-consuming series regulator 105 may be regarded as one series regulator portion.

In this configuration, when the load 9 stops its operation and a consumed current drops excessively, the switching regulator 2 and the series regulator 3 stop their operations to activate the low-current-consuming series regulator 105, thereby outputting the output voltage Vo3 from the power source output terminal OUT. FIG. 5 illustrates an example when the series regulator 3 and the low-current-consuming series regulator 105 are separately provided. However, both of the series regulator 3 and the low-current-consuming series regulator 105 may be integrated into a single series regulator to minimize the consumed current of the single series regulator using a consumed current switching signal from the control circuit 4. Further, the constant voltages Va3 and Vb3 may be the same as the constant voltages Va2 and Vb2, respectively.

Thus, when switching the output voltage Vo1 of the switching regulator 2, each of the above-described power supply apparatuses 1 and 100 simultaneously activates the switching regulator 3 to make the output voltage Vo2 of the series regulator 3 lower than the output voltage Vo1 of the switching regulator 2. This smoothly switches the output voltage Vo1 of the switching regulator 2 and minimizes a noise generated by the output voltage Vo so that a malfunction of each of the apparatuses 1 and 100 can be prevented. In addition, the output voltage Vo is optimally selected for each operation mode of the load 9 to reduce the power consumption. Further, when a consumed voltage which is supplied to the power source apparatus is low, the power source apparatus stops the operation of the switching regulator 2 to provide power only with the series regulator 3, thereby reducing power consumption.

Figure 6:
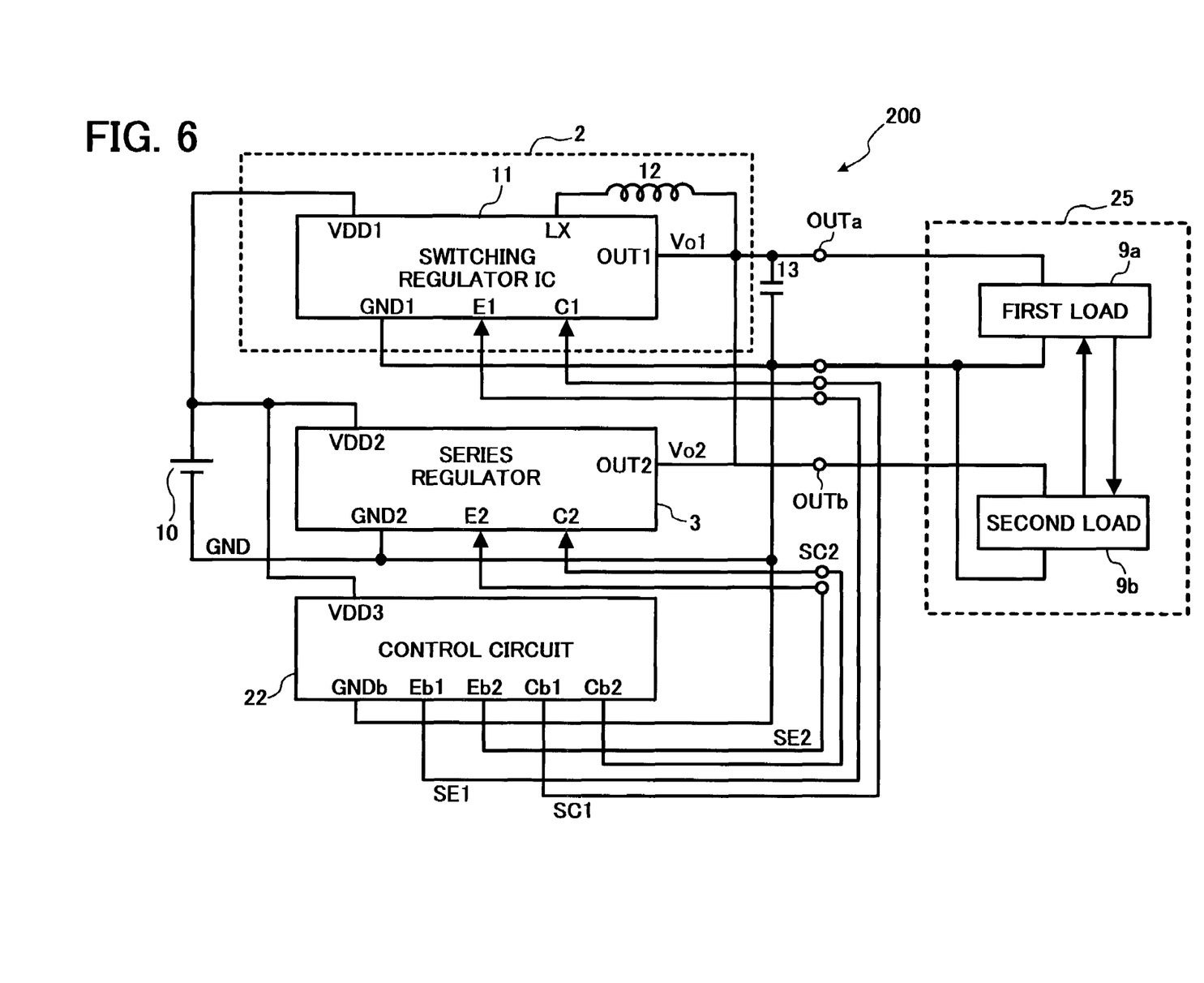
FIG. 6 is a block diagram illustrating an example of a power supply apparatus according to another preferred embodiment of the present invention.

FIG. 6 is a block diagram illustrating an example of a power supply apparatus according to another embodiment of the present invention. Furthermore, in FIG. 6, the same reference numbers are given to the same components as those in FIG. 3 and the detailed descriptions of these components are omitted. Thus, only differences between FIG. 3 and FIG. 5 are described below.

The power supply apparatus 200 of FIG. 6 is similar to the power supply apparatus 1 of FIG. 3, except for a control circuit 22. The control circuit 22 controls the switching regulator 2 and the series regulator 3.

As described above, the output terminal OUT1 of the switching regulator 2 and the output terminal OUT2 of the series regulator 3 are connected to the output terminal OUTa and the output terminal OUTb of the power supply apparatus 200, respectively. The control signal input terminal E1 is connected to a control signal output terminal Eb1 of the control circuit 22. The control signal input terminal E1 receives the control signal SE1 for controlling start and stop operations of the switching regulator 2. Likewise, the control signal input terminal E2 is connected to a control signal output terminal Eb2 of the control circuit 22. The control signal input terminal E2 receives the control signal SE2 for controlling start and stop operations of the series regulator 3.

Accordingly, the switching signal input terminal C1 is connected to a switching signal output terminal Cb1 of the control circuit 22. The switching signal input terminal C1 receives the voltage switching signal SC1 for controlling a switching of a voltage value of the output voltage Vo1 in the switching regulator 2. Likewise, the switching signal input terminal C2 is connected to a switching signal output terminal Cb2 of the control circuit 22. The switching signal input terminal C2 receives the voltage switching signal SC2 for controlling a switching of a voltage value of the output voltage Vo2 in the series regulator 3. The control circuit 22 receives power from the direct current power source 10, and operates by the power supply voltage Vbat from the direct current power source 10 serving as a power source.

Moreover, a negative power supply input terminal GNDb of the control circuit 22 is connected to the negative power supply terminal of the direct current power source 10 and receives the ground voltage GND. Further, connected between the output terminal OUTa and the ground voltage GND is a first load 9a. Connected between the output terminal OUTb and the ground voltage GND is a second load 9b. The first load 9a and the second load 9b which have predetermined functions form a part of a system apparatus 25.

The first load 9a receives the output voltage Vo1 of the switching regulator 2 as a power supply voltage. The second load 9b receives the output voltage Vo2 of the series regulator 3 as a power supply voltage. Since the first load 9a operates at greater power source voltage than the second load 9b, the control circuit 22 causes the switching regulator 2 and the series regulator 3 to output respective predetermined constant voltages so as to provide a formula Vo1>Vo2.

In this case, the power supply voltage Vbat is 5 volts, the constant voltage Va1 is 3 volts, the constant voltage Vb1 is 2.5 volts, and the constant voltage Va2 is 2.9 volts, the constant voltage Vb2 is 2.4 volts. In this configuration, an operation control example of the switching regulator 2 and the series regulator 3 controlled by the control circuit 22 is explained with reference to a timing chart of FIG. 7.

Figure 7:
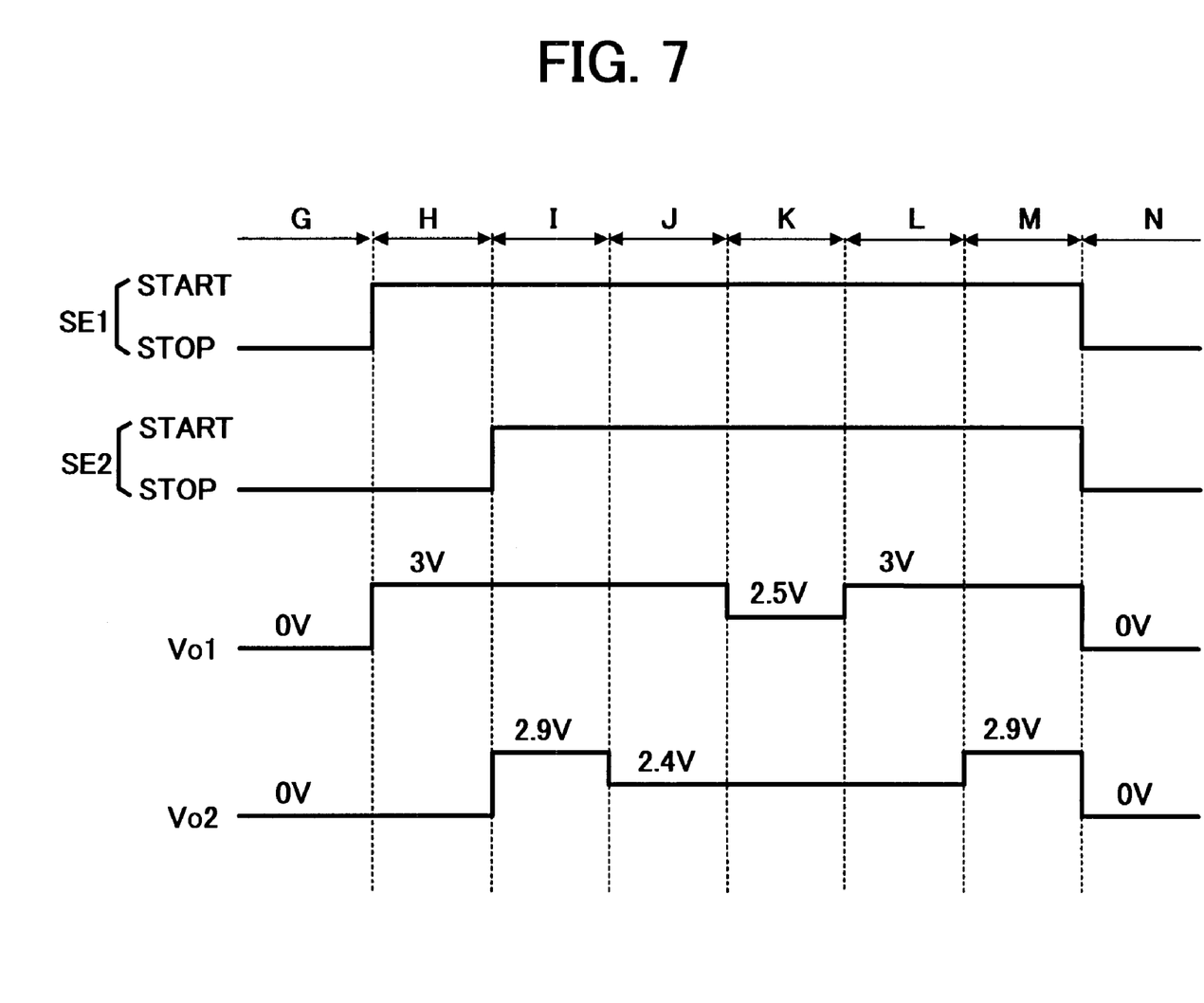
FIG. 7 is a timing chart illustrating an exemplary relationship of signals shown in FIG. 6.

In FIG. 7, a time period G is a time period during which the output voltages Vo1 and Vo2 output from the switching regulator 2 and the series regulator 3, respectively, are interrupted and are 0 volts.

In the time period G, the switching regulator 2 has the control signal input terminal E1 and the switching signal input terminal C1 receive low level control signal SE1 and low level voltage switching signal SC1, respectively. Simultaneously, the series regulator 3 has the control signal input terminal E2 and the switching signal input terminal C2 receive low level control signal SE2 and low level voltage switching signal SC2, respectively. Thus, the switching regulator 2 and the series regulator 3 stop their operations. The output terminals OUTa and OUTb, therefore, output a voltage of 0 volts.

A time period H is a time period during which the output voltage Vo1 outputs 3 volts to the output terminal OUTa from the switching regulator 2.

In the time period H, the switching regulator 2 has the control signal input terminal E1 and the switching signal input terminal C1 receive high level control signal SE1 and low level voltage switching signal SC1, respectively. Simultaneously, the series regulator 3 has the control signal input terminal E2 and the switching signal input terminal C2 receive low level control signal SE2 and low level voltage switching signal SC2, respectively. Thus, the switching regulator 2 starts its operation while the series regulator 3 stops its operation. The output terminals OUTa and OUTb, therefore, output voltages of 3 volts and 0 volts, respectively.

A time period I is a time period during which the switching regulator 3 is activated.

In the time period I, when the control signal SE1 of the switching regulator 2 remains at a high level, the control signal SE2 of the series regulator 3 rises to a high level, increasing the output voltage Vo2 of the series regulator 3 from 0 volts to 2.9 volts. The resulting voltage switching signals SC1 and SC2 remain at low levels. The output terminal OUTa, therefore, continues to output a voltage of 3 volts and the output terminal OUTb outputs a voltage of 2.9 volts.

A time period J is a time period during which the output voltage Vo2 of the series regulator 3 is switched from 2.9 volts to 2.4 volts in order to switch the output voltage Vo1 of the switching regulator 2 from 3 volts to 2.5 volts.

In the time period J, when the voltage switching signal SC1 of the switching regulator 2 remains at a low level, the voltage switching signal SC2 of the series regulator 3 rises to a high level, decreasing the output voltage Vo2 of the series regulator 3 to 2.4 volts. At this time, both of the control signals SE1 and SE2 remain at a high level. Therefore, the output terminal OUTa continues to output a voltage of 3 volts and the output terminal OUTb outputs a voltage of 2.4 volts, respectively.

A time period K is a time period during which the output voltage Vo1 of the switching regulator 2 is switched from 3 volts to 2.5 volts.

In the time period K, when the voltage switching signal SC2 of the series regulator 3 remains at a low level, the voltage switching signal SC1 of the switching regulator 2 rises to a high level, decreasing the output voltage Vo1 of the switching regulator 2 to 2.5 volts. At this time, both of the control signals SE1 and SE2 remain at a high level. Therefore, the output terminal OUTa outputs a voltage of 2.5 volts and the output terminal OUTb continues to output a voltage of 2.4 volts.

A time period L is a time period during which the output voltage Vo1 of the switching regulator 2 is increased to 3 volts in preparation for setting the output voltage Vo2 of the series regulator 3 to 2.9 volts.

In the time period L, when the voltage switching signal SC2 of the series regulator 3 remains at the high level, the voltage switching signal SC1 of the switching regulator 2 is decreased to a low level, increasing the output voltage Vo1 of the switching regulator 2 to 3 volts. At this time, both of the control signals SE1 and SE2 remain at a high level. Therefore, the output terminal OUTa outputs a voltage of 3 volts and the output terminal OUTb continues to output a voltage of 2.4 volts.

A time period M is a time period during which the output voltage Vo2 of the series regulator 3 rises to 2.9 volts.

In the time period M, when the voltage switching signal SC1 of the switching regulator 2 remains at a low level, the voltage switching signal SC2 to the series regulator 3 is decreased to the low level, increasing the output voltage Vo2 of the series regulator 3 to 2.9 volts. At this time, both of the control signals SE1 and SE2 remain at a high level. Therefore, the output terminal OUTa continues to output a voltage of 3 volts and the output terminal OUTb outputs a voltage of 2.9 volts.

A time period N is a time period during which the switching regulator 2 and the series regulator 3 stop their operations. In this period, both the control signal SE1 of the switching regulator 2 and the control signal SE2 of the series regulator 3 are decreased to a low level. As a result, the output voltage Vo1 of the switching regulator 2 and the output voltage Vo2 of the series regulator 3 fall to 0 volts.

Thus, in the power supply apparatus 200, the first load 9a receives the output voltage Vo1 of the switching regulator 2 as a power supply voltage and the second load 9b receives the output voltage Vo2 of the series regulator 3 as a power supply voltage. The first load 9a operates at greater power source voltage than the second load 9b so that the control circuit 22 controls the output voltages of the switching regulator 2 and the series regulator 3 to provide the formula Vo1>Vo2. This decreases a circuit scale and provides an output voltage suitable for the loads receiving voltage under different conditions without causing a voltage leakage. Further, for each operation mode of the first and second loads 9a and 9b, the output voltages Vo1 and Vo2 can be optimally selected to reduce the electric power consumption.

As described above, as examples, the power supply apparatuses 1, 100, and 200 supply power sources to the control circuits 4 of FIGS. 3 and 5 and the control circuit 22 of FIG. 6 from the direct current power source 10. However, it is understood that the invention is not limited to the specific embodiments. It may be powered by another regulator (not shown) which generates and outputs a predetermined constant voltage from power supply voltage Vbat generated from the direct current power source 10. Moreover, in the above-described embodiments, an exemplary operation of controlling each output voltage of the switching regulator 2 and the series regulator 3 is performed. However, it is understood that the invention is not limited to the specific embodiments. Further, one embodiment performs an exemplary operation using each one of the switching regulator 2 and the series regulator 3. However, it is understood that the invention is not limited to the specific embodiment.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. A power supply apparatus, comprising:
   a switching regulator which performs start and stop operations in response to a first control signal and generates a first constant voltage in response to a first voltage switching signal to output the first constant voltage as a first output voltage;
   a series regulator which performs start and stop operations in response to a second control signal and generates a second constant voltage in response to a second voltage switching signal to output the second constant voltage as a second output voltage; and
   a controller which generates the first and second control signals and the first and second voltage switching signals, controls the switching regulator and the series regulator to simultaneously operate for at least a predetermined time period to lower a voltage level of the first output voltage using the first and second control signals, respectively, and controls the switching regulator and the series regulator such that the first output voltage of the switching regulator is greater than the second output voltage of the series regulator using the first and second voltage switching signals.

2. The power supply apparatus as defined in claim 1, wherein the controller generates a third control signal and a third voltage switching signal.

3. The power supply apparatus as defined in claim 2, wherein the series regulator includes a plurality of series regulators and the controller selectively activates the plurality of series regulators using the third control signal and the third voltage switching signal.

4. The power supply apparatus as defined in claim 3, wherein at least one of the plurality of series regulators is a low-current-consuming series regulator that consumes less power less than the rest of the plurality of series regulators and the controller activates the low-current-consuming series regulator in a low-consuming-current mode of the apparatus.

5. A power supply apparatus, comprising:
   switching regulating means for performing start and stop operations in response to a first control signal and generating a first constant voltage in response to a first voltage switching signal to output the first constant voltage as a first output voltage;
   series regulating means for performing start and stop operations in response to a second control signal and generating a constant voltage in response to a second voltage switching signal to output the constant voltage as a second output voltage; and
   controlling means for generating the first and second control signals and the first and second voltage switching signals, controlling the switching regulating means and the series regulating means to simultaneously operate for at least a predetermined time period to lower a voltage level of the first output voltage using the first and second control signals, respectively, and controlling the switching regulating means and the series regulating means such that the first output voltage of the switching regulating means is greater than the second output voltage of the series regulating means using the first and second voltage switching signals.

6. The power supply apparatus as defined in claim 5, wherein the controlling means generates a third control signal and a third voltage switching signal.

7. The power supply apparatus as defined in claim 6, wherein the series regulating means includes a plurality of series regulating means, and the controlling means selectively activates the plurality of series regulating means using the third control signal and the third voltage switching signal.

8. The power supply apparatus as defined in claim 7, wherein at least one of the plurality of series regulating means is a low-current-consuming series regulating means for consuming less power than the rest of the plurality of series regulating means and the controlling means activates the low-current-consuming series regulating means in a low-consuming-current mode of the apparatus.

9. A power supply method, comprising the steps of:
   generating a first control signal for turning on and off a switch regulator;
   generating a second control signal for turning on and off a series regulator;
   controlling the first and second control signals to activate the switching regulator and the series regulator in at least a predetermined time period;
   generating a first voltage switching signal for causing the switch regulator to generate a first voltage output;
   generating a second voltage switching signals for causing the series regulator to generate a second voltage output; and
   controlling the first and second voltage switching signals such that the switch and series regulators operate simultaneously in the time period to lower a voltage level of the first output voltage and such that the first output voltage of the switching regulator is greater than the second output voltage of the series regulator.

10. The power supply method as defined in claim 9, wherein the series regulator includes a plurality of series regulating circuits and the first and second controlling steps selectively activate one of the plurality of series regulating circuits.

11. The power supply method as defined in claim 10, wherein at least one of the plurality of series regulating circuits is a low-current-consuming series regulating circuit which consumes less power than the rest of the plurality of series regulating circuits and the first and second controlling steps activate the low-current-consuming series regulating circuit in a low-consuming-current mode of the apparatus.

12. A power supply method, comprising the steps of:
   generating a first control signal for turning on and off a switch regulator;
   generating a second control signal for turning on and off a series regulator;
   generating a first voltage switching signal for turning on and off the switch regulator;
   generating a second voltage switching signal for turning on and off the series regulator; and
   controlling the first control signal and the first voltage switching signal to activate the switching regulator and the second control signal and second voltage switching signal to activate the series regulator, wherein the control step controls the first and second control signals to simultaneously activate the switching regulator and the series regulator for at least a predetermined time period to lower a voltage level of the output of the switching regulator.

13. The power supply method as defined in claim 12, wherein the controlling step controls the first and second voltage switching signals such that the first output voltage of the switching regulator is greater than the second output voltage of the series regulator.

14. A power supply method, comprising the steps of:

generating a first control signal for turning on and off a switch regulator;

generating a second control signal for turning on and off a series regulator;

generating a first voltage switching signal for turning on and off the switch regulator;

generating a second voltage switching signals for turning on and off the series regulator; and controlling the first control signal and the first voltage switching signal to activate the switching regulator and the second control signal and second voltage switching signal to activate the series regulator, wherein the controlling step controls the first and second voltage switching signals such that an output voltage of the switching regulator is greater than an output voltage of the series regulator and such that switching and series regulators operate simultaneously when lowering a voltage level of the output voltage of the switching regulator.

* * * * *